(12) United States Patent
Sridhar et al.

(10) Patent No.: US 7,660,241 B2
(45) Date of Patent: Feb. 9, 2010

(54) LOAD BALANCING IN A VIRTUAL PRIVATE NETWORK

(75) Inventors: Kamakshi Sridhar, Plano, TX (US); Maher Ali, Richardson, TX (US)

(73) Assignee: Alcatel Lucent, Paris (FR)

( * ) Notice: Subject to any disclaimer, the term of this patent is extended or adjusted under 35 U.S.C. 154(b) by 866 days.

(21) Appl. No.: 10/894,795

(22) Filed: Jul. 20, 2004

(65) Prior Publication Data
US 2006/0018252 A1    Jan. 26, 2006

(51) Int. Cl.
*H04J 1/16* (2006.01)
(52) U.S. Cl. .................. 370/229; 370/238; 709/239; 709/240; 709/241; 709/718
(58) Field of Classification Search ................ 455/13.1, 455/12.1; 370/216, 225, 244, 229–238; 709/239, 709/240, 241, 718
See application file for complete search history.

(56) References Cited

U.S. PATENT DOCUMENTS

| | | | |
|---|---|---|---|
| 6,215,765 B1 * | 4/2001 | McAllister et al. .......... 370/217 |
| 6,542,934 B1 | 4/2003 | Bader et al. | |
| 6,850,487 B2 * | 2/2005 | Mukherjee et al. .......... 370/225 |
| 7,124,187 B1 * | 10/2006 | Kodialam et al. .......... 709/226 |
| 2002/0009072 A1 | 1/2002 | Halme | |
| 2002/0067693 A1 * | 6/2002 | Kodialam et al. .......... 370/216 |
| 2003/0023750 A1 | 1/2003 | Basturk | |
| 2003/0142674 A1 | 7/2003 | Casey | |
| 2004/1003727 | * | 2/2004 | Zelig et al. .................. 370/390 |
| 2006/0171316 A1 * | 8/2006 | El-Sakkout et al. ......... 370/235 |

FOREIGN PATENT DOCUMENTS

| EP | 0465090 A | 1/1992 |
|---|---|---|
| EP | 1538789 A | 6/2005 |

OTHER PUBLICATIONS

Lasserre, et al.; Virtual Private LAN Services Over MPLS; Internet Draft (draft-lasserre-vkompella-ppvpn-vpls-04.txt); Mar. 2003; pp. 1-26; IETF Provider Provisioned VPN Working Group.

(Continued)

*Primary Examiner*—Vincent P Harper
*Assistant Examiner*—Khai M Nguyen
(74) *Attorney, Agent, or Firm*—Garlick, Harrison & Markison, LLP

(57) ABSTRACT

A network system (10). The system comprises a plurality of nodes (PE, CE). Each node in the plurality of nodes is coupled to communicate with at least one other node in the plurality of nodes. Further, each node in the plurality of nodes is coupled to communicate to another node via a respective primary path and via a respective backup path. Still further, each node in the plurality of nodes is operable to perform the steps of, when receiving network traffic as a receiving node, detecting delay (110, 120; 130, 140; 160, 170) in traffic received from a transmitting node, and, in response to detecting delay, communicating a signal to the transmitting node. In response to the signal, the transmitting node is operable to dynamically adjust (150; 190) a distribution of traffic through a respective primary path and a respective backup path from the transmitting node to the receiving node.

19 Claims, 2 Drawing Sheets

OTHER PUBLICATIONS

Kompella, et al.; Dcoupled Virtual Private LAN Services; Internet Draft (draft-kompella-ppvpn-dtls-02.txt); Nov. 2002; pp. 1-16; IETF PPVPN Working Group.

Dinan, et al.; Analytical framework for dynamic traffic partitioning in MPLS networks; IEEE International Conference on Communications, ICC 2000; Jun. 18-22, 2000; pp. 1604-1608; vol. 3.

Zaumen, et al.; Load-balanced anycast routing in computer networks; Fifth IEEE Symposium on Computers and Communications; Proceedings; ISCC 2000; Jul. 3-6, 2000; pp. 566-574.

Brockers, et al.; Metro Ethernet—deploying the extended campus using Ethernet technology; 28th Annual IEEE International Conference on Local Computer Networks; LCN '03; Proceedings; Oct. 20-24, 2003; pp. 594-604.

Daans, L.; Alcatel Metro Node; Alcatel Telecommunications Review; 1st Qtr. 2002; pp. 13-18; vol. 2002, No. 1.

Santitoro, R.; Metro Ethernet Services—A Technical Overview; Metro Ethernet Forum; Feb. 5, 2004; pp. 1-19.

\* cited by examiner

LOAD BALANCING IN A VIRTUAL PRIVATE NETWORK

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to network traffic load balancing in a virtual private network.

Ethernet networks have found favor in many applications in the networking industry for various reasons. For example, Ethernet is a widely used and cost effective medium, with numerous interfaces and speed capability up to the Gbps range. Ethernet networks may be used to form a Metro Ethernet Network ("MEN"), which is generally a publicly accessible network that provides a Metro domain, typically under the control of a single administrator, such as an Internet Service Provider ("ISP"). A MEN is typically used to connect between an access network and a core network. The access network often includes private or end users making connectivity to the network. The core network is used to connect to other Metro Ethernet Networks and it provides primarily a packet switching function.

A MEN typically consists of a number of Provider Edge ("PE") nodes that are identified and configured for communicating with one another prior to the communication of packet traffic. The PE nodes are connected in a point-to-point manner, that is, each PE node is connected to another PE node in an emulated and bi-directional virtual circuit manner, where each such connection is achieved by a Label Switched Path ("LSP"). An LSP is sometimes informally referred to as a link. Thus, each PE node may communicate to, and receive packets from, an adjacent PE node. Further, along each LSP, between adjacent PE nodes, are often a number of Provider ("P") nodes. The P nodes maintain no state information and serve primarily a routing function and, thus, are understood not to disturb the point-to-point connection between the PE nodes of the MEN, which are more intelligent devices. Also, traffic is said to hop from node to node, including to/from each intermediate P node. Further, a different number of P nodes may be connected in one communication direction between two adjacent PE nodes as compared to the reverse communication direction between those same two adjacent PE nodes. Lastly, note that PE nodes in the MEN are also coupled, sometimes through an intermediate node, to one or more Customer Edge ("CE") nodes, where those CE nodes thereby represent the interface between the MEN and an adjacent access network.

With the development of the MEN architecture, there have further evolved additional topologies associated with such a network. Certain types of such overlays are referred to as virtual private networks ("VPN"), and as a key example are implemented as private networks operating over the public global Internet. VPN provides the benefits of a private network such as access to company servers and intranet communications, while users of the VPN also benefit from the low operational costs offered by it because the underlying hardware is provided by the Internet. One type of VPN now being offered is the provider provisioned VPN, or "PP-VPN" (also, "PPVPN"). The PP-VPN is typically offered by an ISP, whereby the ISP assumes various obligations to meet an entity's networking requirements and then implements those requirements into a VPN. In any event, as implemented, the PP-VPN often includes another aspect that pertains to the preferred embodiments that are described later, which is the virtual private local area network service ("VPLS"). A VPLS can be of various forms, such as a hierarchical VPLS, a decoupled VPLS, or others. In any event, a VPLS creates an emulated local area network ("LAN") segment for a given set of nodes in a MEN. The VPLS delivers an ISO layer 2 broadcast domain that is fully capable of learning and forwarding on Ethernet MAC addresses that is closed to a given set of nodes. Thus, within the VPLS, packets may be broadcast to all nodes on the VPLS. Note also that more than one VPLS may be included in a single MEN and, thus, certain PE nodes of that MEN may be a part of more than one VPLS.

Given the various nodes, attributes, and connectivity described above and known in the art, complexities arise in efficient use of the system resources on the MEN and the VPLS so as to optimally route traffic—such an optimization is often referred to as load balancing, that is, balancing the traffic load on those various resources. Prior art balancing solutions treat the issue as one of consideration for the primary paths on the MEN. In contrast, and as detailed below in connection with the preferred embodiments, a MEN is created in which load balancing is handled as a part of the design that also includes the secondary, or so-called "protection" or "backup" paths of the network. As a result, greater optimization may be achieved in the load balancing, as further detailed below.

BRIEF SUMMARY OF THE INVENTION

In the preferred embodiment, there is a network system. The system comprises a plurality of nodes. Each node in the plurality of nodes is coupled to communicate with at least one other node in the plurality of nodes. Further, each node in the plurality of nodes is coupled to communicate to another node via a respective primary path and via a respective backup path. Still further, each node in the plurality of nodes is operable to perform the steps of, when receiving network traffic as a receiving node, detecting delay in traffic received from a transmitting node, and, in response to detecting delay, communicating a signal to the transmitting node. In response to the signal, the transmitting node is operable to dynamically adjust a distribution of traffic through a respective primary path and a respective backup path from the transmitting node to the receiving node.

Other aspects are also described and claimed.

DETAILED DESCRIPTION OF THE INVENTION

By way of introduction to various aspects of the present inventive scope, note that the preferred embodiments establish a provider-provisioned virtual private network ("PP-VPN") that achieves load balancing in part by using its backup or protection paths to potentially carry part of the network traffic load. In other words, for traffic along a "primary" path, there is also a corresponding backup, "secondary," or "protection" path along which traffic may be communicated should a disconnect or termination occur with respect to the primary path. To provide a context for such embodiments, a brief discussion is now provided of three known protection types. A first protection type is known as 1+1 protection, and it is characterized by requiring a completely reserved bandwidth on the backup path that is equal to that on the primary path. For example, for a channel having a primary path bandwidth of 2.2 Gbps, then 2.2 Gbps is reserved along the backup path and that path cannot be used at all to the extent that such use would interfere with the reserved 2.2 Gbps. A second protection type is known as 1:1 protection, and it is characterized by also requiring a reserved bandwidth on the backup path that is equal to that on the primary path; however, during non-protection events traffic identified as low priority by an indicator in the traffic packets may be routed along and using the backup path reserved bandwidth, but that reserved bandwidth on the backup path may be pre-empted during a protection events so as to communicate certain high priority traffic. A third protection type is known as 1:n protection, and it is characterized by permitting multiple primary paths to share a reserved bandwidth on the backup path, again substituting high priority traffic during protection events for low priority traffic that is permitted on the backup path during non-protection events.

Figure 1:
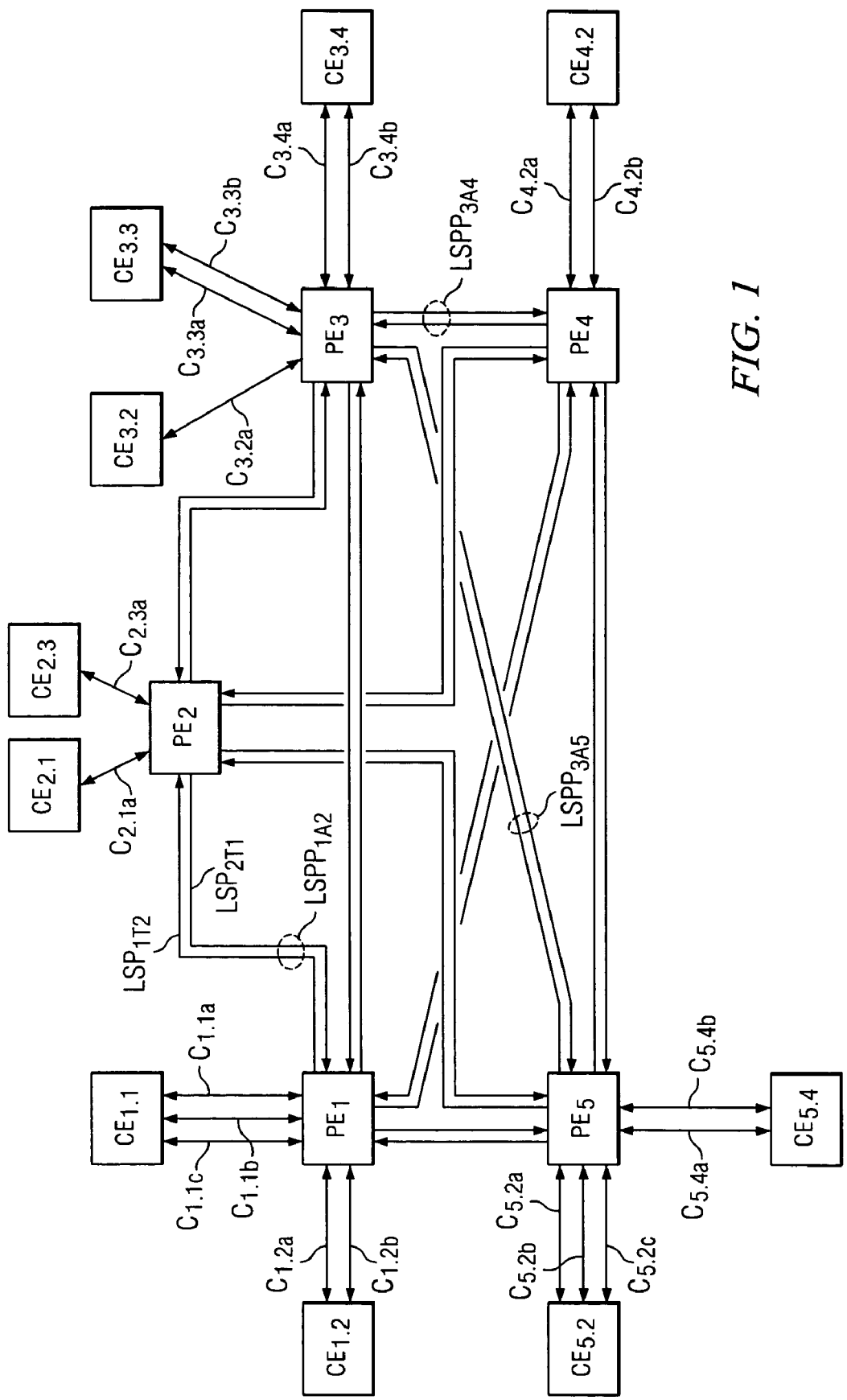
FIG. 1 illustrates a network system according to an example of the preferred embodiments.

By way of illustration of one preferred inventive implementation, FIG. 1 depicts a network system designated generally at 10. Network system 10, in the preferred embodiments, is a Metro Ethernet Network ("MEN") that includes virtual private local area network services ("VPLS"). System 10 as shown structurally in FIG. 1 illustrates such a network as is known in the art, where the illustration is included to introduce various concepts and conventions. However, as detailed below, the structure in its operation is further improved upon in connection with the distribution of packet traffic during instances of unacceptable traffic delay, during both non-protection and protection events.

By way of example, system 10 includes five Provider Edge ("PE") nodes $PE_1$, $PE_2$, $PE_3$, $PE_4$, and $PE_5$, where the choice of five is only as an illustration and one skilled in the art should appreciate that any number of such nodes may be included. Indeed, note that often a MEN will include considerably more than five PE nodes. Each PE node may be constructed as a processing device by one skilled in the art using various hardware, software, and programming so as to be operable to perform the functionality described in this document. In system 10, preferably the network is fully meshed, that is, each PE node $PE_x$ is connected to every other PE node in the system, where each connection is by way of a respective Label Switched Path ("LSP") illustrated with an arrow. For sake of reference in this document, the bi-directional connection between two nodes is by way of an LSP pair ("LSPP") that includes one LSP for communications in one direction from a first PE node to a second node and another LSP for communications in the opposite direction, that is, from the second PE node to the first PE node. As an example, PE node $PE_1$ is connected, via four respective LSPPs, to each of PE nodes $PE_2$, $PE_3$, $PE_4$, and $PE_5$. Also, for sake of convention, the identifier used in FIG. 1 for each LSPP identifies the two PE nodes between which the LSPP is connected. For example, between PE nodes $PE_1$ and $PE_2$ is an $LSPP_{1A2}$; as another example, between PE nodes $PE_3$ and $PE_4$ is an $LSPP_{3A4}$. Also, for sake of convention, each LSP in an LSPP is designated as $LSP_{xTy}$, where x is the source PE node and y is the destination PE node for a given LSP. To simplify FIG. 1, only a few of these LSPs are so labeled. Thus, by way of example, in $LSPP_{1A2}$ which is between PE nodes $PE_1$ and $PE_2$, PE node $PE_1$ may communicate to PE node $PE_2$ by $LSP_{1T2}$ and PE node $PE_2$ may communicate to PE node $PE_1$ by $LSP_{2T1}$. According to the preferred embodiment, the various LSPs of system 10 in FIG. 1 define the point-to-point interfaces along which traffic is allowed to pass. Thus, in general, for the fully-meshed configuration of system 10, any PE node in that system may communicate directly to any other PE node, that is, with that communication not being required to pass through one or more intermediate PE nodes. Finally, as a MEN system, while not shown, it should be understood that between adjacent PE nodes there may be located a number of Provider ("P") nodes. Thus, there may be numerous node "hops" encountered by traffic between two PE nodes, as the traffic hops from P node to P node as between two PE nodes and with a final hop to the destination PE node.

FIG. 1 also illustrates that each PE node in the MEN is also often connected to one or more Customer Edge ("CE") nodes, where those CE nodes thereby represent the interface between the MEN and an adjacent access network. Each CE node is assigned to a VPLS logical entity such that all CE nodes having a same VPLS logical entity belong to the same single VPLS; also, by way of convention in this document, the subscript for each CE node is in the form of x.y (i.e., $CE_{x,y}$), where x is the PE node to which the CE node is connected and y is the VPLS logical entity. For example, CE node $CE_{1,1}$ is connected to PE node $PE_1$ and belongs to a $VPLS_1$, while CE node $CE_{1,2}$ is also connected to PE node $PE_1$ but belongs to a $VPLS_2$. As another example, CE node $CE_{2,1}$ is connected to PE node $PE_2$ and belongs to $VPLS_1$; as a result, since both CE nodes $CE_{1,1}$ and $CE_{2,1}$ belong to the same VPLS, then those two CE nodes are connected to one another via these "virtual" connections. Thus, either PE node $PE_1$ or $PE_2$ may serve as either an ingress or egress node for a communication along $VPLS_1$, where a node is an ingress node when it receives a communication outside of the PE-to-PE mesh and communicates it to another PE node, and where a node is an egress node when it receives a communication from another PE node inside the PE-to-PE mesh and communicates it to a CE node outside of that mesh. In contrast, note by way of example that PE node $PE_3$ is not connected to a $VPLS_1$ logical entity, but instead it is connected to $VPLS_2$, $VPLS_3$, and $VPLS_4$. Accordingly, PE node $PE_3$ does not act as either an ingress or egress PE node with respect to $VPLS_1$, but it may, however, do so with respect to any of $VPLS_2$, $VPLS_3$, and $VPLS_4$. Given these conventions, one skilled in the art should appreciate the remaining connectivity of FIG. 1. Note also that often the connection of a CE node to a PE node may be through one or more intermediate P nodes and also may be through another intermediate node between the PE node and the CE node, where such an intermediate node is referred to as a layer 2 Provider Edge ("L2PE") node, but such nodes are not shown so as to simplify the present illustration. Lastly, note also for sake of example in system 10 that various of the PE nodes have more than one connection to a corresponding CE node, and for sake of designation each such connection is labeled "C," along with the subscript of the CE node as well as a lower case letter so as to distinguish the connection from any other connection between the same CE-PE node connections. For example, between CE node $CE_{1,1}$ and PE node $PE_1$, there are three such connections $C_{1,1a}$, $C_{1,1b}$, and $C_{1,1c}$. However, some CE-PE node pairs only have a single connection between them, such as in the case of CE node $CE_{3,3}$ and PE node $PE_3$, which have a single connection $C_{3,3a}$ between them.

According to the preferred embodiment, prior to permitting communication of traffic along system 10, the primary and backup paths are first established. In one approach, these paths may be established according to principles known in the art. In an alternative and preferred approach, however, these paths are established based on the recognition of a key aspect of the preferred embodiments. Specifically, in the preferred embodiment, in certain instances, the backup path is not only defined in part by its use according to either 1+1, 1:1, or 1:n protection, and according to whether a protection event (i.e., when a failure occurs along a primary path) has occurred, but the backup path also may be used for purposes of load balancing. In other words, according to the prior art of a VPLS MEN, the backup paths are reserved for use during a protection event, with the additional use in either a 1:1 or 1:n protection scheme that permits use of the backup path for some high priority traffic during non-protection events. In contrast, the present inventors recognize that protection event failures are relatively infrequent as compared to the occurrences of traffic congestion and delay and, thus, the resources reserved for the relatively unlikely failure event may instead be used part of the time, namely, to alleviate congestion (i.e., for load balancing). Thus, the following describes various aspects of the preferred approach to load balancing, and thereafter is provided a discussion of the preferred approach for setting up the primary and protection paths in view of the load balancing functionality.

In one aspect of the inventive scope, the preferred embodiments include a novel way of providing virtual circuit ("VC") labels for backup paths, which is discussed later in view of the following background. In the prior art, it is known that a MEN network communicates packets according to a predetermined format, where that format includes various fields. One of these fields is known as a VC label, where each PE node-to-PE node LSP is given such a VC label for primary traffic. In other words, in the prior art, during the learning process and for primary paths, each PE node on the MEN receives packets from all other PE nodes in the MEN. As a result, the PE receiving node is able to construct a table in which it associates the MAC address for each transmitting PE node with an arbitrarily-assigned VC label. As a result, after the learning process, the receiving PE node, when seeking to send a packet back to the PE node that was a transmitting node during learning, may then consult its table and apply the earlier-assigned VC label into the packet so as to route the packet along the LSPP between that receiving PE node and that transmitting PE node.

Concluding the description of FIG. 1, note also that it illustrates only a first set of connections for a first, or primary, network. In other words, for each CE-node supported logical VPLS entity, that logical VPLS entity is typically connected to only a single PE node; however, it should be understood that FIG. 1 may be characterized with different connectivity to illustrate a second, or backup, network whereby each logical VPLS entity is connected to a different single PE node. The combination of the primary and backup networks will be understood by one skilled in the art to thereby provide protection so that if a connection failure occurs on one network (e.g., the first or "primary" network), then traffic may be established as an alternative along the second, or backup, network.

As detailed later, the preferred embodiments permit additional traffic to be included on backup paths between nodes in a manner that differs from the prior art, where in the prior art a more restrictive use of those paths is permitted and occurs based on the type of protection (i.e., 1+1, 1:1, 1:n) and under the condition of whether a protection event, or primary path failure, has occurred. Toward this end, in one aspect of the preferred embodiment, there is a methodology for assigning VC labels to the backup paths. In the prior art, the same technique used for assigning VC labels to primary paths is typically used for assigning VC labels to the backup paths. Accordingly, a table or database at each node grows in response to the number of paths, and the necessary lookup is required to that table for transmission along either primary or backup paths. In contrast, in the preferred embodiments, first a range of VC labels are reserved for the primary path VC labels, with the reservation being sufficiently large so as to provide enough labels for all primary paths. For example, consider in one instance the reservation of VC labels 1 to 1,000 for the primary paths in system 10. Next, and according to the preferred embodiments, a fixed offset, or constant, is applied to the primary path VC label range for determining the corresponding backup path VC label, and that constant differs based on the type of protection offered. For example, a constant of 1,000 may be applied for 1+1 protection, so that the constant is an additive offset, when applied to the group of VC labels for primary paths of 1 to 1,000, that renders a reserved group of VC labels 1,001 to 2,000 for backup paths carrying 1+1 traffic. Thus, for a primary path having a VC label of 1, its corresponding backup path, if of a 1+1 protection type, has a VC label of 1,001 (i.e., 1,000+1=1,001). Similarly, a constant of 2,000 may be applied for 1:1 protection, so that the constant is an additive offset, when applied to the group of VC labels for primary paths of 1 to 1,000, that renders a reserved group of VC labels 2,001 to 3,000 for backup paths carrying 1:1 traffic. Lastly, a constant of 3,000 may be applied for 1:n protection, whereby a reserved group of VC labels 3,001 to 4,000 is provided for backup paths carrying 1:n traffic. With this methodology, note that when a PE node receives a packet along a backup path during learning, it is immediately informed of the backup nature of the packet in that the VC label will exceed the upper limit on primary path VC labels (e.g., 1,000). Thus, the PE node is not required to update its MAC address-to-VC label table in response to such a packet, that is, that table will only be required with respect to primary path VC labels. Accordingly, such a table and the resources it consumes are reduced as compared to the prior art, and each node may transmit along it primary paths according to its MAC address-to-VC label table.

Figure 2:
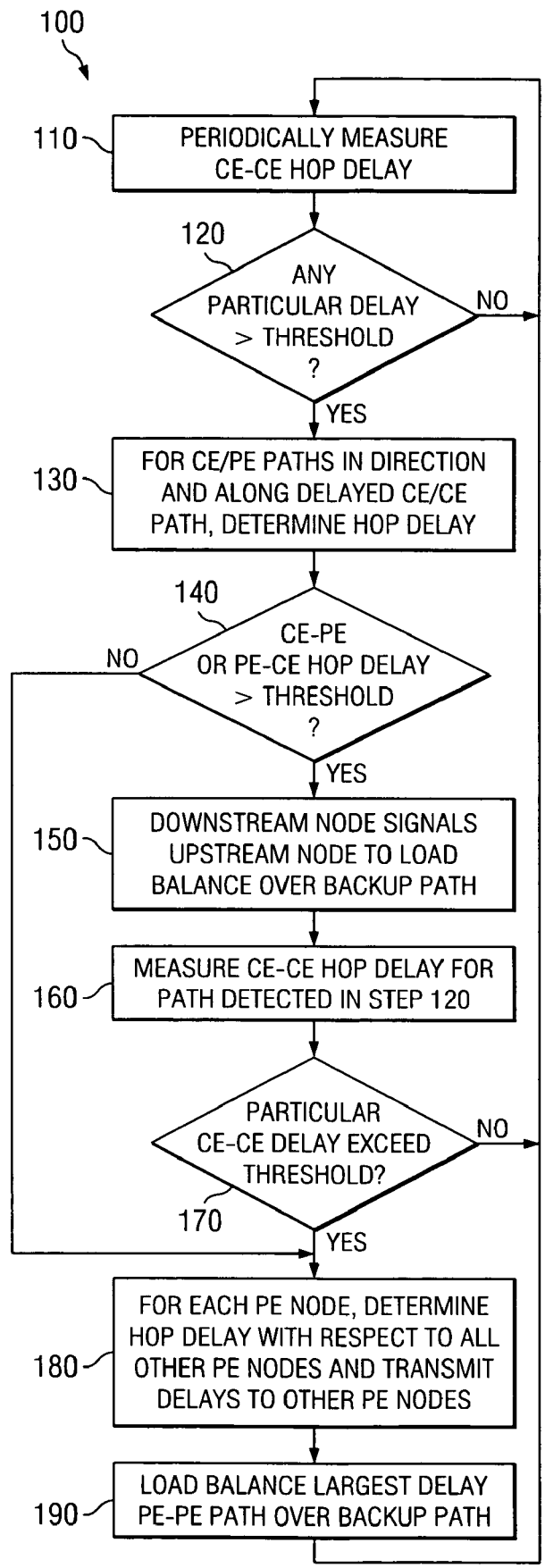
FIG. 2 illustrates a flow chart of a method 100 of operation for the nodes of system 10 of FIG. 1.

FIG. 2 illustrates a flow chart of a method 100 of operation for the PE and CE nodes of system 10 of FIG. 1. By way of introduction, in the preferred embodiment, therefore, preferably each node, whether PE node or CE node, is programmed so as to implement the overall method 100, that is, preferably the functionality is distributed into each node so as to avoid any complexity arising from a centralized approach. One skilled in the art may develop various manners for programming each such node accordingly, based on various considerations such as the hardware and software available at each node. From the following discussion of method 100, one skilled in the art also should appreciate that in general method 100 seeks to identify instances of reduced traffic performance and to improve that performance. Such reduction may have various causes, such as high delay, jitter, and so forth. In any event, method 100 endeavors to improve performance by detecting delay and in response shifting at least a portion of the network traffic, that is, to load balance traffic, to one or more backup paths, both when there is or is not a network protection event. Moreover, the preferred method seeks to first load balance with respect to communications between a CE node and a PE node, and if such an effort is unsuccessful in satisfactorily improving performance, the method seeks to second load balance with respect to communications between a PE node and another PE node. This preferred hierarchy is chosen with the recognition that load balancing in PE node-to-PE node communications may be less desirable because a PE node-to-PE node communication may represent communications from multiple ingress or egress CE nodes and, thus, altering the balance of those communications may affect multiple CE nodes when in fact the performance penalty may be due to only a single CE node-to-CE node communication path. Lastly, while method 100 is shown generally as a flow chart, note that various of its steps may occur in overlapping fashions or with certain steps re-arranged and, thus, such steps could be shown in a state diagram or still other alternative fashions.

Turning to FIG. 2 in detail, method 100 commences with a step 110. In step 110, which periodically repeats, each CE node determines the hop delay with respect to packets it receives from every other CE node in system 10. In other words, the CE ingress-to-CE egress node hop delay, that is, from a CE node communicating inward to a PE node (i.e., ingress) and then passing toward a CE node receiving a packet away from a PE node (i.e., egress), is periodically determined for all CE nodes in system 10. To achieve these determinations, packets received by a receiving egress CE node from a transmitting ingress CE node will include a time stamp that indicates the time of transmission by the transmitting ingress CE node. Thus, the receiving egress CE node may determine a time difference between the time of receipt of each such packet and the time of transmission as indicated in the packet. In addition to this time difference, the receiving node is informed of the number of hops between the transmitting and receiving CE nodes, where the hops in one embodiment may include the P nodes (not explicitly shown) that are located between the PE nodes that communicate the packet between each pair of CE nodes. Thus, a ratio of the total time passage divided by the number of hops provides a per hop delay, and that hop delay is maintained or stored so as to be analyzed as described below. Next, method 100 continues from step 110 to step 120.

In step 120, each CE node determines whether any of the hop delays it determined in step 100 exceeds a threshold by comparing each hop delay to a threshold. The threshold may be set by one skilled in the art according to various ascertainable considerations, where by way of example that threshold may be established to detect delays that are significantly large so as to be the result of jitter or other delay-causing factors. If, for the given CE node, each of its CE node-to-CE node delays is less than the step 120 threshold, then method 100 returns to step 110 so that after another period once again the delays determinations are made. On the other hand, if the largest hop delay determined by the CE node in its step 110 exceeds the threshold, then method 100 continues from step 120 to step 130.

In step 130, for the path having an undesirable delay as detected in step 120, per hop delays are determined as between the connected CE and PE nodes that are included in the direction that was detected as the delayed path. For example, consider the instance where CE node $CE_{1.1}$ detects an undesirable delay in traffic to it from CE node $CE_{3.2}$. Thus, the direction of the delay is from CE node $CE_{3.2}$ to CE node $CE_{1.1}$. In response, step 130 determines the hop delay from CE node $CE_{3.2}$ to the ingress PE node $PE_3$ and also from the egress PE node $PE_1$ to CE node $CE_{1.1}$. Toward this end, therefore, note that when a delay is detected in step 120, above, the detecting egress CE node also informs the corresponding ingress CE node, so as to instigate the proper measurements of the present step 130. In any event, during step 130, each PE node/CE node combination determines the hop delay between those two nodes, in the direction of the step 120 detected delay, and for sake of reference let the time interval over which that delay is measured be $t_1$. During $t_1$, the egress CE node (e.g., $CE_{1.1}$) measures the hop delay of packets received from the egress PE node (e.g., $PE_1$), while the ingress PE node (e.g., $PE_3$) measures the hop delay of packets received from the ingress CE node (e.g., $CE_{3.2}$). Next, method 100 continues from step 130 to step 140.

In step 140, the step 130 hop delay determinations are compared to a threshold. The threshold may be established by one skilled in the art according to various considerations, where the threshold should be set such that a hop delay that exceeds the threshold represents an unacceptably large hop delay and one for which an attempt at reducing the delay is desirable. If none of the delay exceeds the step 140 threshold, then method 100 moves from step 140 to step 180, discussed later. If, on the other hand, any of the step 140 hop delays (or the largest of those delays) exceeds the step 140 threshold, then method 100 continues from step 140 to step 150.

In step 150, the downstream one of either the PE node or CE node of the PE node/CE node combination from step 140 requests the upstream node to which it is connected to load balance traffic for future communications to the downstream node. Thus, in an example of an egress CE and PE node, CE node $CE_{1.1}$, acting as the egress CE node, is downstream (in terms of the direction of traffic) from the upstream PE node $PE_1$ to which CE node $CE_{1.1}$ is connected, so if that downstream node $CE_{1.1}$, in step 140 detected a hop delay beyond the step 140 threshold, then in step 150 that downstream node $CE_{1.1}$ signals PE node $PE_1$ to load balance future communications to CE node $CE_{1.1}$. In this regard and per the preferred embodiments as discussed earlier, the load balancing may be achieved by PE node $PE_1$ communicating future packets along a different route to CE node $CE_{1.1}$ if one is available, and in addition communicating traffic along the backup path from PE node $PE_1$ to CE node $CE_{1.1}$, even during non-protection events. The particular extent of balancing as between the primary and any backup path may be ascertained by one skilled in the art. In one approach, the number of flows whose performance would be affected by a change in load balancing these flows may be considered. For example, one approach may be to load balance only those flows having a relatively large product of the number of flows times per hop delay. In any event, note therefore that the load balance is in response to a detected traffic delay and provides a dynamic alteration of the extent of traffic distribution along the primary and backup bath between the upstream and downstream node. Similarly, as an example of an ingress PE and CE node, PE node $PE_3$ acting as the ingress PE node, is downstream from the upstream CE node $CE_{30.2}$ to which PE node $PE_3$ is connected, so if that downstream node $PE_3$ in step 140 detected a delay beyond the step 140 threshold, then in step 150 that downstream node $PE_3$ signals CE node $CE_{3.2}$ to load balance future communications, thereby load balancing future packets along a different route from CE node $CE_{3.2}$ to PE node $PE_3$ if one is available, and in addition communicating traffic along the backup path from CE node $CE_{3.2}$ to PE node $PE_3$, even during non-protection events. After step 150, method 100 continues to step 160.

In step 160, following the PE-to-CE or CE-to-PE node balancing of step 150, the CE node-to-CE node path detected as undesirably delayed in step 120 again determines its CE node-to-CE node hop delay, where the delay determination may be made in the same manner as described above with respect to step 110. However, in the present step 160, only the downstream (i.e., egress) CE node in that path is required to make such a measurement, where the other CE nodes in system 10 are not so required. Thereafter, method 100 continues from step 160 to step 170.

In step 170, the downstream CE node that determined the particular CE node-to-CE node hop delay of step 160 compares that delay to a threshold. In one preferred embodiment, the step 170 threshold may be the same as the threshold used in step 120, or in an alternative embodiment, the two thresholds may differ. For example with respect to the latter, the step 170 threshold may be lower so as to recognize that the load balancing adjustment of step 150 reduced hop delay somewhat to a level, which while greater than the step 120 threshold is still less than the step 170 threshold and therefore an acceptable amount of hop delay now that the step 150 adjustment has occurred. In any event, the step 170 threshold also may be set by one skilled in the art according to various ascertainable considerations. If, for the CE node operating in step 170, its particular CE node-to-CE node hop delay is less than the step 170 threshold, then method 100 returns to step 110 so that after another period once again the step 110 delays measurements are made. On the other hand, if the step 160-determined hop delay exceeds the step 170 threshold, then method 100 continues from step 170 to step 180.

From the preceding, one skilled in the art will appreciate that step 180 is reached after a PE node-to-CE node or CE node to PE node load balance has occurred, but when that balancing has not corrected delay to an extent sufficient to satisfy the threshold of step 170. In response, in step 180 each PE node in system 10 determines a respective per hop delay table that stores determinations of downstream hop delay to it from each other PE node in system 10 to the PE node that stores the respective delay table. For example, PE node $PE_1$ measures and then stores in its delay table the traffic hop delay to it from packets sent from each of PE nodes $PE_2$, $PE_3$, $PE_4$, and $PE_5$. To achieve these determinations, packets received by each PE node from a transmitting PE node will include a time stamp that indicates the time of transmission by the transmitting PE node. Thus, the receiving PE node may determine a time difference between the time of receipt of each such packet and the time of transmission as indicated in the packet, and that difference is divided by the number of P node hops between the corresponding PE nodes so as to provide a per hop delay value. In the preferred embodiment, these time measurements are made over a time interval $t_2$, and $t_2$ is preferably greater than the time interval $t_1$ associated with the time measurements of step 110. Measurements over the time interval $t_2$ may be made in various fashions, such as either averaged over that time period or the maximum occurring measurement during that time period. Further, for reasons more clear below, in the preferred embodiment the hop delay table is organized so as to rank each entry in terms of the extent of hop delay. For example, the table may be placed in largest-to-smallest order of delay such that the first table entry represents the largest delay from another PE node while the last table entry represents the least delay from another PE node in system 10. Finally, upon the completion of $t_2$, each PE node transmits its hop delay table to each other PE node in system 10. Thus, at the conclusion of step 180, each PE node is informed of the downstream hop delay times with respect to itself as well as the other PE nodes in system 10. Next, method 100 continues from step 180 to step 190.

In step 190, the downstream PE node having the largest hop delay to it, as that information was determined and routed around system 10 in step 180, performs load balancing along the LSP as between it and the upstream PE node that transmits along the delayed LSP. In this regard and per the preferred embodiment as discussed earlier, the load balancing may be achieved between the two subject PE nodes such that the upstream PE node communicates at least some future packets along the backup path to the downstream PE node, even during non-protection events. Thus, again in response to traffic delay, a dynamic alteration is made to the distribution of traffic along the primary path and the backup path, from the subject upstream PE node to the subject downstream PE node. Also, the particular extent of balancing as between the primary and backup path between the two PE nodes may be ascertained by one skilled in the art.

From the preceding discussion of method 100, one skilled in the art should appreciate various aspects as they relate to traffic improvement in system 10 and the selective use of dynamic traffic distribution along backup paths, even during non-protection events. If traffic delays are acceptable then no change in traffic routing via primary and backup paths is made. However, if a per hop delay between CE nodes in system 10 is larger than a threshold, then a first attempt at reducing delay is made by load balancing, namely, by dynamically redistributing traffic along the primary and backup paths between a CE and PE node in the delayed path between the relevant CE nodes. If this balancing is sufficient to improve hop delay to an acceptable level, then additional load balancing preferably is not undertaken. However, if per hop delay is still unsatisfactory, then additional load balancing is achieved by dynamically redistributing some traffic along the primary and backup path between a combination of two PE nodes within the meshed PE nodes of system 10. Moreover, any of these dynamic alterations may be made also during protection events, although the actual result of the load balancing preferably will differ due to the change of resource use as it is occurring during the protection event. In any case, in the preferred embodiments, an effort is made to prevent load balancing on multiple PE node-to-PE node LSPs at the same time since that may not be necessary and may not be effective. Instead, the preferred embodiment endeavors to load balance only a single LSP at a time and, more particularly, the one with the worst per hop delay (or a hop delay that is relevant due to a large number of flows).

Given that the preferred embodiments contemplate use of backup paths for load balancing in the manner described above, note also that the initial setup of the primary and backup (i.e., protection) paths also may be provided in a manner differing from the prior art. In general, this setup methodology is performed prior to the communication of typical traffic in system 10. As a matter of introduction, the setup is based on any of the three potential protection schemes, where those schemes consist of 1+1, 1:1, and 1:n, each of which was described earlier with respect to FIG. 1. Further, for each primary path LSP that is established, a backup LSP also will be established, and it may be of any of these three types of protection. Thus, different LSPs may have different types of protection within the same system 10. Also by way of introduction, the preferred embodiment setup is made in an effort to reduce overall risk. In this regard, the preferable definition of risk is the percentage of high priority traffic times the number of hops on the primary path times the percentage utilization of the worst link. In other words, an increase in any one or more of these factors increase risk. Hence, a relatively large risk indicates that there is a high probability that there a need will arise for load balancing due to poor performance. In this case, preferably the backup paths are not shared, that is, preferably such backup paths use the fewest shared resources.

Given the preceding, the preferred methodology for establishing protection paths in view of potential load balancing is as follows. First, primary paths routes are identified, as are their corresponding 1+1 backup paths. To achieve this step, first the respective connections between each PE node and each other PE node in system 10 are ranked in decreasing order of bandwidth requirements, that is, with the highest rank assigned to the connection that has highest bandwidth requirements. Second, each LSP is established, in an order that corresponds from the highest to lowest bandwidth rank. For example, a first LSP is established between the PE node-to-PE node connection that has the largest bandwidth rank, then a second LSP is established between the PE node-to-PE node connection that has the second-to-largest bandwidth rank, and so forth until all primary LSPs are established. Lastly, the backup paths are established for 1:1 and 1:n. However, in the preferred embodiment, these backup paths are optimized for purposes of the above-described load balancing as follows. As an initial criterion, backup paths are set up for those primary paths having a relatively high risk, with the sharing restriction that routes each of the backup paths such that they do not share any link on the previously setup backup paths. However, at some point, as more backup paths are established that correspond to reduced risk levels, satisfying the initial criterion will not be possible because the set of existing links/paths will exhaust all possible backup paths that are not to share any links of previously setup backup paths. At this point, any additional backup paths may share links, but note that they will correspond to paths of decreased risk. As a result, in the end, it is most likely that the highest risk backup path is not shared at all, while the less risk backup paths are shared by more than one primary path.

From the above illustrations and description, one skilled in the art should appreciate that the preferred embodiments provide a method and system for load balancing in response to delay detection and using the backup paths in a VPLS. Moreover, the preferred embodiments provide a method for each receiving node to know very quickly of packets received on backup paths, due to the fixed offset of the VC labels used for primary paths versus those used on backup paths. As a final benefit, while the present embodiments have been described in detail, various substitutions, modifications or alterations could be made to the descriptions set forth above without departing from the inventive scope which is defined by the following claims.

The invention claimed is:

1. A network system, comprising:
a plurality of nodes, wherein each node in the plurality of nodes is coupled to communicate with at least one other node in the plurality of nodes;
wherein each node in the plurality of nodes is coupled to communicate to another node via a respective primary path and via a respective backup path, wherein each backup path supports at least one of 1+1, 1:1, and 1:n protection type; and
wherein each node in the plurality of nodes is operable to perform the steps of:
when receiving network traffic as a receiving node, detecting delay in traffic received from a transmitting node; and
in response to detecting delay during a non-protection event, communicating a signal to the transmitting node, wherein in response to the signal the transmitting node is operable to dynamically load balance traffic by adjusting a distribution of traffic between a respective primary path and a respective backup path from the transmitting node to the receiving node.

2. The network system of claim 1:
wherein the plurality of nodes comprises:
a first plurality of nodes, wherein each node in the first plurality of nodes is coupled to communicate with all other nodes in the first plurality of nodes;
a second plurality of nodes, wherein each node in the second plurality of nodes is coupled to communicate with at least one node in the first plurality of nodes;
wherein each node in both the first plurality of nodes and the second plurality of nodes is coupled to communicate to another node via a respective primary path and via a respective backup path;
wherein each node in both the first plurality of nodes and the second plurality of nodes is operable to perform the steps of:
when receiving network traffic as a receiving node, detecting delay in traffic received from a transmitting node;
in response to detecting delay, communicating a signal to the transmitting node, wherein in response to the signal the transmitting node is operable to dynamically adjust a distribution of traffic through a respective primary path and a respective backup path from the transmitting node to the receiving node.

3. The system of claim 2 wherein each node in both the first plurality of nodes and the second plurality of nodes is operable to perform the additional steps of:
when receiving network traffic as a receiving node, receiving a network packet along a primary path from a transmitting node;
when receiving network traffic as a receiving node, receiving a network packet along a backup path from the transmitting node; and
distinguishing the received network packet received along the backup path from the network packet received along the primary path in response to a fixed constant difference between an identifier of the backup path and an identifier of the primary path.

4. The system of claim 3:
wherein the first plurality of nodes comprise provider edge nodes;
wherein the first plurality of nodes comprise customer edge nodes; and
wherein the operability of any node to dynamically adjust a distribution of traffic through a respective primary path and a respective backup path occurs first for a primary respective path and a respective backup path between a customer edge node and a provider edge node.

5. The system of claim 4 wherein the operability of any node to dynamically adjust a distribution of traffic through a respective primary path and a respective backup path occurs second for a primary respective path and a respective backup path between a provider edge node and another provider edge node.

6. The system of claim 5 wherein the delay comprises hop delay.

7. The system of claim 2:
wherein the first plurality of nodes comprise provider edge nodes;
wherein the first plurality of nodes comprise customer edge nodes; and
wherein the operability of any node to dynamically adjust a distribution of traffic through a respective primary path and a respective backup path occurs first for a primary respective path and a respective backup path between a customer edge node and a provider edge node.

8. The system of claim 7 wherein the operability of any node to dynamically adjust a distribution of traffic through a respective primary path and a respective backup path occurs second for a primary respective path and a respective backup path between a provider edge node and another provider edge node.

9. The system of claim 2 wherein each node in both the first plurality of nodes and the second plurality of nodes is operable to perform the steps of, as the transmitting node:
   receiving the signal; and
   dynamically adjusting a distribution of traffic through a respective primary path and a respective backup path from the transmitting node to the receiving node, both during a non-protection event and during a protection event.

10. The system of claim 2 wherein each node in both the first plurality of nodes and the second plurality of nodes is operable to perform the steps of, as the transmitting node:
   receiving the signal; and
   further in response to a number of flows, dynamically adjusting a distribution of traffic through a respective primary path and a respective backup path from the transmitting node to the receiving node.

11. The system of claim 2 wherein each node in both the first plurality of nodes and the second plurality of nodes is operable to perform the steps of, as the transmitting node:
   receiving the signal; and
   further in response to a number of flows, dynamically adjusting a distribution of traffic through a respective primary path and a respective backup path from the transmitting node to the receiving node, both during a non-protection event and during a protection event.

12. The system of claim 2 wherein each node in both the first plurality of nodes and the second plurality of nodes is operable to perform the additional steps of:
   when receiving network traffic as a receiving node, receiving a network packet along a primary path from a transmitting node;
   when receiving network traffic as a receiving node, receiving a network packet along a backup path from the transmitting node;
   distinguishing the received network packet received along the backup path from the network packet received along the primary path in response to a fixed constant difference between an identifier of the backup path and an identifier of the primary path;
   wherein each backup path supports one of 1+1, 1:1, and 1:n protection types; and
   wherein the fixed constant differs based on the protection type.

13. The system of claim 2 wherein the first and second plurality of nodes form a virtual private local area network.

14. The system of claim 2:
   wherein the first plurality of nodes comprise provider edge nodes; and
   wherein the first plurality of nodes comprise customer edge nodes.

15. The system of claim 1 wherein each node in both the first plurality of nodes and the second plurality of nodes is operable to perform the additional steps of:
   when receiving network traffic as a receiving node, receiving a network packet along a primary path from a transmitting node;
   when receiving network traffic as a receiving node, receiving a network packet along a backup path from the transmitting node;
   distinguishing the received network packet received along the backup path from the network packet received along the primary path in response to a fixed constant difference between an identifier of the backup path and an identifier of the primary path; and
   wherein the fixed constant differs based on the protection type.

16. A network node for use in a network system, wherein the network system comprises a plurality of nodes that include the node, wherein each node in the plurality of nodes is coupled to communicate with at least one other node in the plurality of nodes, wherein each node in the plurality of nodes is coupled to communicate to another node via a respective primary path and via a respective backup path, wherein each backup path supports at least one of 1+1, 1:1, and 1:n protection type; and
   wherein the network node is operable to perform the steps of:
      when receiving network traffic as a receiving node, detecting delay in traffic received from a transmitting node; and
      in response to detecting delay, communicating a signal to the transmitting node, wherein in response to the signal the transmitting node is operable to dynamically adjust a distribution of traffic through a respective primary path and a respective backup path from the transmitting node to the receiving node.

17. The network node of claim 16:
   wherein the plurality of nodes comprises:
      a first plurality of nodes, wherein each node in the first plurality of nodes is coupled to communicate with all other nodes in the first plurality of nodes;
      a second plurality of nodes, wherein each node in the second plurality of nodes is coupled to communicate with at least one node in the first plurality of nodes;
   wherein each node in both the first plurality of nodes and the second plurality of nodes is coupled to communicate to another node via a respective primary path and via a respective backup path;
   wherein either the first plurality of nodes or the second plurality of nodes may comprise the network node;
   wherein the network node is operable to perform the steps of:
      when receiving network traffic as a receiving node, detecting delay in traffic received from a transmitting node;
      when receiving network traffic as a receiving node and in response to detecting delay, communicating a signal to the transmitting node, wherein in response to the signal the transmitting node is operable to dynamically adjust a distribution of traffic through a respective primary path and a respective backup path from the transmitting node to the receiving node.

18. The network node of claim 17 wherein the network node is operable to perform the steps of:
   when receiving a signal from a transmitting node in the plurality of nodes, wherein the signal is in response to delay detected by the transmitting node, dynamically adjusting a distribution of traffic through a respective primary path and a respective backup path from the network node to the transmitting node.

19. A method for load balancing in a node in a network system, wherein the network system includes a plurality of nodes coupled to communicate with at least one other node in the plurality of nodes via a respective primary path and via a respective backup path, wherein each backup path supports at least one of 1+1, 1:1, and 1:n protection type, comprising:
   detecting delay in traffic received from a transmitting node;
   in response to detecting delay, communicating a signal to the transmitting node;

in response to the signal during a non-protection event, switching a portion of traffic flows from a respective primary path to a respective backup path to dynamically load balance the traffic flows between the respective primary path and the respective backup path from the transmitting node to the receiving node, wherein the respective backup path provides at least one of 1+1, 1:1, and 1:n protection to the respective primary path.

* * * * *

UNITED STATES PATENT AND TRADEMARK OFFICE
CERTIFICATE OF CORRECTION

PATENT NO.        : 7,660,241 B2                                    Page 1 of 1
APPLICATION NO.   : 10/894795
DATED             : February 9, 2010
INVENTOR(S)       : Sridhar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1534 days.

Signed and Sealed this

Twenty-eighth Day of December, 2010

David J. Kappos
*Director of the United States Patent and Trademark Office*